United States Patent [19]

O'Saben

[11] Patent Number: 5,042,865

[45] Date of Patent: * Aug. 27, 1991

[54] WIND DEFLECTOR

[76] Inventor: Stephen V. O'Saben, 30402 Thomas St., Willowick, Ohio 44095

[*] Notice: The portion of the term of this patent subsequent to Jul. 4, 2006 has been disclaimed.

[21] Appl. No.: 523,353

[22] Filed: May 14, 1990

[51] Int. Cl.⁵ .............................................. B60J 1/20
[52] U.S. Cl. ........................................ 296/91; 98/2.12
[58] Field of Search .................. 296/91; 98/2.12, 2.19

[56] References Cited

U.S. PATENT DOCUMENTS

| | | | |
|---|---|---|---|
| 3,427,067 | 2/1969 | Kish | 296/91 X |
| 3,667,369 | 6/1972 | Smith | 98/2.12 |
| 4,134,612 | 1/1979 | Nelson | 98/2.12 X |
| 4,577,929 | 3/1986 | Guillen | 296/91 X |
| 4,844,529 | 7/1989 | O'Saben | 296/91 |
| 4,846,522 | 7/1989 | Bonstead et al. | 296/91 |
| 4,878,707 | 11/1989 | Meyers | 296/91 |

Primary Examiner—Margaret A. Focarino
Assistant Examiner—Joseph D. Pape

Attorney, Agent, or Firm—Renner, Otto, Boisselle & Sklar

[57] ABSTRACT

A wind deflector for mounting on the side of a truck cab, comprising a vertically elongated panel of transparent material; two flanges, one at each vertical end of the panel; two bends connecting the flanges to the panels; and two reinforcing plates for strengthening the panel along the bends. The panel is preferably a thick sheet of transparent plastic bent at its vertical ends to form the flanges. Each reinforcing plate includes a vertical portion secured flush against a portion of the panel and a horizontal portion secured flush against one of the flanges. The wind deflector also includes a mounting assembly for mounting the wind deflector to the truck cab. In one embodiment, the mounting assembly includes a threaded stud projecting through one of the reinforcing plates and one of the flanges, and a mounting bracket. The mounting bracket includes a planar arm portion having a slot dimensioned to receive the threaded stud. In another embodiment, the mounting assembly includes a mounting bracket having a planar arm portion secured to a vertical portion of the panel.

17 Claims, 2 Drawing Sheets

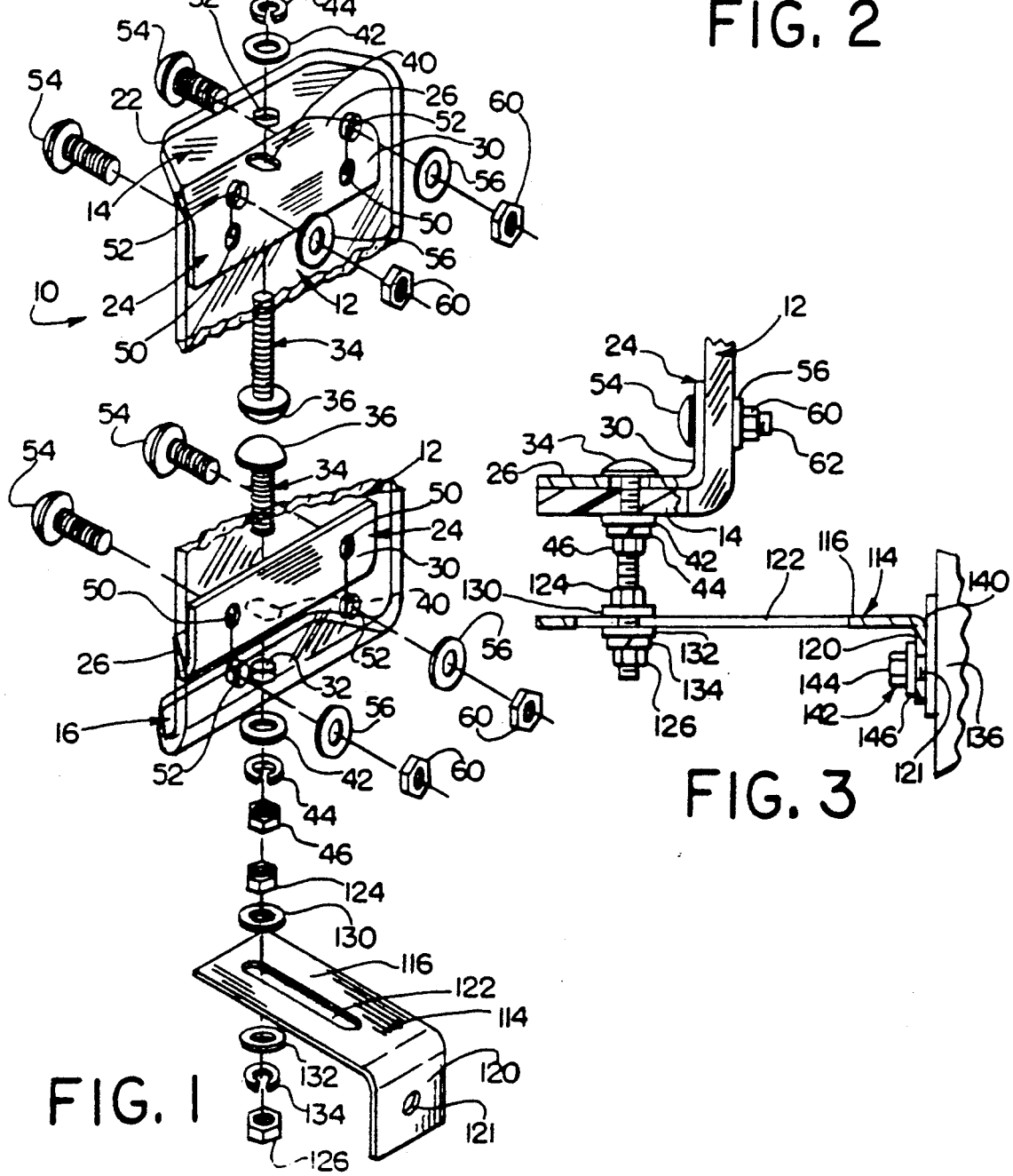

WIND DEFLECTOR

This invention relates generally as indicated to wind deflectors and more particularly to wind deflectors for trucks or highway tractors which enable a driver or passenger to travel in comfort with the window open.

BACKGROUND OF THE INVENTION

Although many highway tractors or trucks are now air conditioned, some drivers nonetheless prefer driving with their windows open both for comfort and better lateral visibility. However, with a window open, the driver is usually struck with a blast of air which is in part caused by the large rear view mirrors at each side of the tractor or truck. Even if the driver could suffer the continuous blast of air, rain or inclement wheather may make it impossible to keep the window open, although during such weather both comfort and visibility might normally dictate the windows be open. Additionally, during such inclement weather, rear view mirrors may tend to collect rain or dirt requiring that they frequently be wiped or cleaned. Unless a driver stops the only way to wipe or clean the mirror may be through an open window. Furthermore, open windows in vehicles such as automobiles or trucks may tend to create drag and impair fuel efficiency.

Accordingly a wind deflector adjacent the side windows of a tractor or truck which would enable the driver and passenger or both to travel in comfort with the windows open, even in rain or wet conditions, would be desirable. Another desirable feature would be a wind deflector design which would assist in maintaining the rear view mirrors clear and also reduce the amount of drag caused by the window beingn open. It would also be beneficial that the angle of the deflector be readily adjustable to obtain these benefits.

A wind deflector is disclosed in U.S. Pat. No. 4,844,529 to O'Saben, issued July 4, 1989, and entitled "Wind Deflector". The wind deflector disclosed in this patent includes a vertically elongated panel of transparent material having a flange at each vertical end. The panel is described as a thick sheet of transparent clear material such as an acrylic sheet. The flanges are formed by heating and forming the ends of the plastic sheet in the area of the bend. In the process of this forming, sometimes a thin line is etched in the sheet to mark the location of the bend. This marking, along with the actual heating and forming, may create a weakness in the area of the bend and the panels may prematurely fracture along the bend. While the O'Saben patent provides a reinforcing plate to protect the flange and distribute the clamping load thereon, this reinforcing plate does not strengthen the area of the bend. It would therefore be desirable for the wind deflector to include features which would strengthen the panel in the bend ara and thereby avoid problems in the event of premature fracture.

Furthermore, a wind deflector should desirably be readily mountable on existing trucks or tractors, be inexpensive, and easy to install and adjust. One convenient place to mount a wind deflector is from the struts of a rear view mirror assembly as shown in applicant's prior patent. Another appropriate location for mounting is the mounting flanges for a rear view mirror assembly. Another acceptable alternative is to secure the wind deflector directly to the vehicle door. The vent window of the truck is another suitable place to mount the wind deflector. Because trucks are not all the same, the best method of mounting the wind deflector may differ from truck to truck. It would therefore be desirable if the wind deflector could be readily mounted in a variety of ways using the same or similar parts.

For these and other reasons, a need remains for an improved wind deflector.

SUMMARY OF THE INVENTION

The present invention provides a wind deflector for mounting on the side of a truck. The wind deflector comprises a vertically elongated panel of transparent material; two flanges, one at each vertical end of the panel; two bends connecting the flanges to the panel; and two reinforcing plates for strengthening the panel along the bend and preventing premature fracture of the bend. Each reinforcing plate includes a vertical portion secured flush against a portion of said panel and a horizontal portion secured flush against each flange.

The wind deflector also includes a mounting assembly for mounting the wind deflector to the truck. In one embodiment, the mounting assembly includes a threaded stud projecting through one of the reinforcing plates and one of the flanges, and a planar arm portion having a slot dimensioned to receive one of the threaded studs. In this manner, the planar arm portion may be adjustably secured along the threaded stud to adjust both the azimuth and radial extent of said panel relative to the side of the truck. The planar arm portion may also include a hole dimensioned to receive a mounting stud whereby the wind deflector may be secured to a horizontal portion of the mounting flange of a truck rear view mirror assembly. Alternatively, the mounting assembly may include a tab having a hole extending perpendicularly from its planar arm portion. A mounting stud, dimensioned to be received in the hole, may cooperate to secure the wind deflector to a vertical portion of a mounting flange of a truck rear view mirror assembly. Another alternative is for the mounting assembly to include an encircling portion for clamping onto the bracket arm struts of a truck rear view mirror assembly.

In another embodiment, the mounting assembly includes a planar arm portion secured to a vertical portion of the panel. The mounting assembly also includes an angle tab joined to this planar arm portion and having a hole. A metal screw dimensioned to be received in the hole may be used to secure the wind deflector directly to the door of the truck. Alternatively, the mounting assembly could include a clip at one end of the planar arm portion for clipping the wind deflector onto a vent window of a truck.

To the accomplishment of the foregoing and related ends the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is an exploded perspective view of a wind deflector in accordance with the present invention showing one form of mounting means at the top and another at the bottom;

FIG. 2 is a side view of the upper end of the wind deflector with the top bracket attached to the appropriate part of the vehicle;

FIG. 3 is a side view of the lower end of the wind deflector with the bottom bracket attached to the appropriate part of the vehicle;

DETAILED DESCRIPTION OF THE PREFERRED EMBODIMENTS

Figure 4:
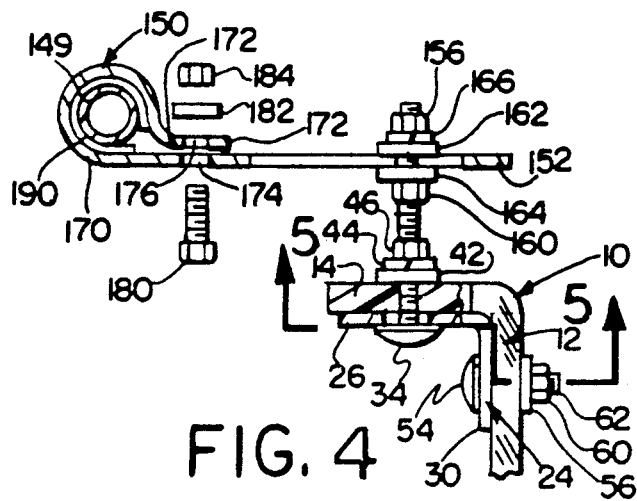
FIG. 4 is a side view of the upper end of another embodiment of the present invention.

Referring now to the drawings in detail and particularly to FIG. 1, a wind deflector 10 according to the present invention is shown. The wind deflector 10 comprises a vertically elongated transparent fairly thick rigid panel 12 having top and bottom flanges 14 and 16 at each vertical end. Both of the flanges 14 and 16 extend away from the viewer as seen in FIG. 1. Preferably, the panel 12 is formed of a thick sheet of transparent clear plastic material such as an acrylic sheet. Suitable acrylic sheets are sold under the trademark LUCITE by DuPont and under the trademark LEXAN by General Electric. The flanges 14 and 16 may be formed by heating and forming the ends of the plastic sheet in the area of the bend. Preferably the edges of each flange are beveled as indicated at 20 with the corners rounded as seen at 22.

The wind deflector 10 also includes two reinforcing plates 24. Each reinforcing plate 24 has a horizontal portion 26 and a vertical portion 30. The horizontal portion 26 has substantially the same surface outline as the interior of the flanges 14 and 16 when assembled and acts to protect the flange and to distribute the clamping load thereon. Additionally, because the reinforcing plate 24 also includes the vertical portion 30, it acts to strengthen the panel along the bend bridging an area of possible weakness and prevent premature fracture.

Each of the flanges 14 and 16 is provided with a central vertical hole indicated at 32 through which projects a threaded flange stud 34. The flange stud 34 has a rounded head 36 and extends (upwardly in flange 14 and downwardly in flange 16) through a slot 40 in the horizontal portion 26 of the reinforcing plate 24. On the outside of the flange is a washer 42, a lock washer 44 and a nut 46. When the nut 46 and associated lock washer 44 are tightened on the flange stud 34, it is clamped and locked to the flange with the major extent of the threaded stud projecting from the flange.

Each reinforcing plate 24 includes two holes 50 in its vertical portion 30 which align with two holes 52 in the panel 12. Two threaded panel studs 54 project from the interior of the panel through holes 50 (in the reinforcing plate 24) and 52 (in the panel 12). On the outside of the panel 12, each panel stud 54 is provided with a washer 56 and a nut 60. When the nut 60 and the associated washer 56 are tightened on the panel stud 54, only a small portion 62 of the stud 54 projects outwardly. (See FIGS. 2 and 3).

The wind deflector 10 is shown in FIG. 1 with one form of a mounting bracket at the top and another at the bottom. Referring to the upper portion of the wind deflector 10 in FIG. 1 and additionally to FIG. 2, the upper mounting bracket is shown generally at 64. The bracket 64 is preferably a stainless steel straight bracket and is secured to the upwardly projecting flange stud 34. The bracket 64 includes a generally planar arm 66 which is provided with a center adjustment slot 70. At one end, the planar arm 66 is provided with a mounting hole 72. The flange stud 34 is adapted to extend through the adjustment slot 70 at any point therealong and be secured to the flange stud by nuts 74 and 75 and interposed washers 76, 78 and 80, the latter being a lock washer. In this manner, the mounting bracket is connected to the panel 12. The straight bracket 64 may be adjusted axially along the flange stud 34 and locked in the selected axial position. Additionally, the slot 70 allows the straight bracket 64 to be adjusted to extend from the flange stud 34 in any azimuth or direction.

The straight bracket 64 is shown attached to a vehicle 90 in FIG. 2. The vehicle 90 has an angle flange 92 secured to it for the mounting of a rear view mirror (not shown). The angle flange 92 has a vertical portion 94 and a horizontal portion 100. The vertical portion 94 is secured to the vehicle 90 by, for instance, a bolt 96. A threaded mounting stud 102 with a hexagonal head 104 extends downwardly through a hole 105 in the horizontal portion 100 and the mounting hole 72 in the straight bracket 64. A washer 106 is positioned above the horizontal portion 100 and a washer 110 is positioned below the bracket 64. A nut 112 locks the bracket in position. The bracket 64 extends outwardly from the vehicle in a generally perpendicular direction, the position of the wind deflector 10 being adjusted by moving the stud 34 within the slot 70 as was explained above. Normally one would use the same bracket, straight or flanged, at each vertical end. However in some cases they could be different as shown.

Referring now to the lower portion of the wind deflector 10 in FIG. 1 and additionally to FIG. 3, another form of attachment to the vehicle is shown. Specifically, a flanged bracket 114 is shown having a planar arm 116 and a perpendicular flange 120 with a centrally located mounting hole 121. A center adjustment slot 122 is located in the planar arm 116 through which the flange stud 34 extends. As in the straight bracket 64 discussed above, the flange stud 34 is adapted to extend through the adjustment slot 122 at any point therealong, allowing axial and azimuth adjustments. Nuts 124 and 126, and interposed washers 130, 132 and 134, secure the flange stud 34 in the desired position.

In FIG. 3 the flanged bracket 114 is shown attached to a vehicle 136 which has a mounting flange 140 for a rear view mirror (not shown). The mounting flange 140 consists of a vertical portion secured to the vehicle in an appropriate manner. A threaded mounting stud 142 with a hexagonal head 144 extends through the mounting flange 140 and the mounting hole 121 in the perpendicular flange 120. The mounting stud 142 and a washer 146 are locked in position so that the bracket 114 extends outwardly perpendicularly from the mounting flange 140, the adjustment slot 122 and the flange stud 34 being used to adjust the positioning of the wind deflector 10 relative to the vehicle 136. If this mounting arrangement were used, preferably the wind deflector 10 would include angled flanges 114 at both its top and bottom flanges.

Figure 5:
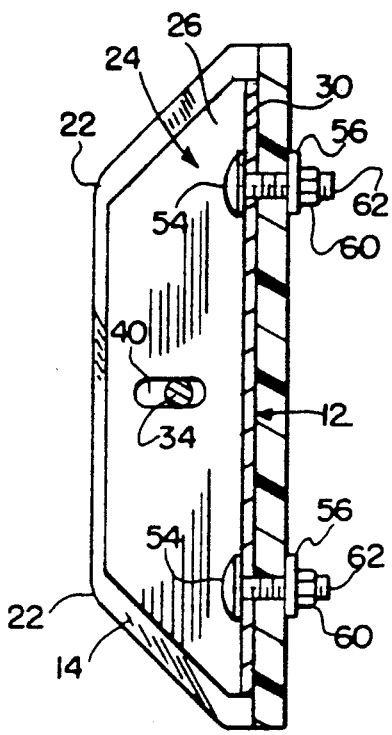
FIG. 5 is a sectional view as seen along line 5—5 in FIG. 4.

Referring now to FIGS. 4 and 5, another embodiment of the present invention is shown. In this embodiment, a clamp arm bracket 150 is used to mount the wind deflector 10 to a vehicle by securing it to rear view mirror struts 149. The bracket 150 is preferably made of stainless steel and is shown in FIG. 4 secured to the upwardly projecting flange stud 34. The bracket 150 includes a planar arm 152 having a center adjustment slot 154. The flange stud 34 may extend through the adjustment slot 154 at any point therealong and is secured in place by nuts 156 and 160, interposed washers 162 and 164, and lock washer 166. The bracket 150 also includes an encircling portion 170 on its outer end. The encircling portion 170 terminates in a tab 172 which is parallel to but spaced from the planar arm 152. Mounting holes 174 and 176 in the arm and tab respectively, accommodate a mounting bolt 180 on which fit washer 182 and nut 184. By tightening the nut and bolt assembly, the encircling portion 170 may clamp the horizontal rear view mirror bracket struts 149. The interior of the encircling portion 170 may be provided with a somewhat soft plastic lining 190 to facilitate the grip on the strut 149.

When using the embodiment illustrated in FIGS. 4 and 5, the arm brackets 150 may extend in opposite directions. Thus the arm bracket at the top may extend to the rear or aft while the arm bracket at the bottom may extend forwardly. Once the clamp arm brackets 150 are secured to the struts by tightening of the bolts 180 and nuts 184, the nuts 156 and 160 may be tightened to lock the clamp brackets to respective top and bottom flange studs 34. Then in order to adjust the angle of the wind deflector 10, the nuts 46 may be loosened to pivot the panel 12 about the axis of the aligned flange studs 34. Once the desired angular adjustment is obtained, the nuts 46 may be tightened. In addition to the vertical adjustment of the clamp arm brackets along the flange studs, a further vertical adjustment may be obtained simply by inverting either clamp arm bracket 150. Since the encircling portion 170 is tangent to the major extent of the arm, inversion of the clamp arm bracket will move the axis of the encircling portion vertically substantially a full diameter of the encircling portion.

Figure 6:
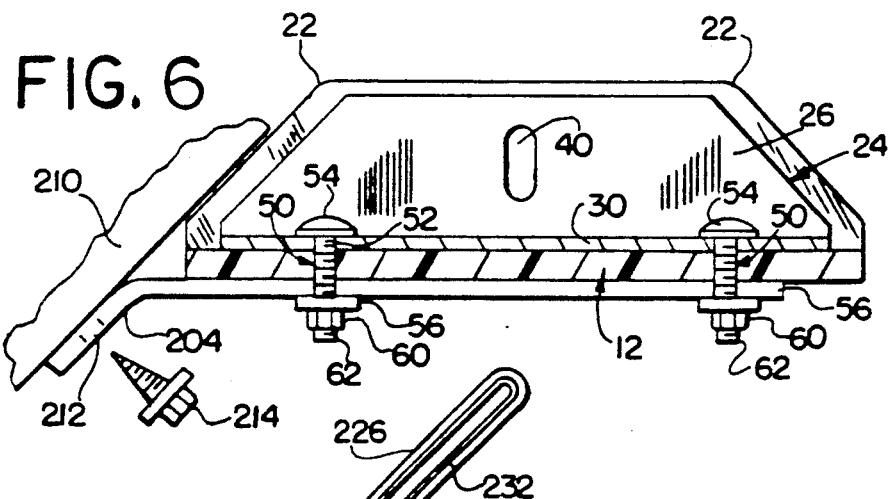
FIG. 6 is a top sectional view of another embodiment of the present invention.

Referring now to FIG. 6, another embodiment of the present invention is shown. This wind deflector includes an angled side flange 200. The side flange 200 is not attached to the flanges 14 and 16 as in the embodiments above, but rather is attached to a portion of the panel 12 adjacent the horizontal portion 30 of the reinforcing plate 24. Of course, the side flange may be attached to any vertical portion of the panel 12 which is convenient. The flange studs 34 may still be employed in the top and bottom flanges 14 and 16 of the sheet 12 to secure the reinforcing plates thereto. One may appreciate, however, that a bolt of extended length is not necessary in this embodiment.

The angled side flange 200 includes a planar arm portion 202 and an angled tab 204 extending from the planar arm portion at an angle approximately equal to 135° C. The planar arm portion 202 has two holes 206 which align with the holes 52 in the horizontal portion 30 of the reinforcing plate 30 and with holes 50 in the panel 12. the panel studs 54 extend through holes 52, holes 50 and holes 206 and the parts are locked together by washer 56 and nut 60. Again, only a small portion 62 of the bolt extends beyond the nut. The angled tab 204 has a mounting hole 212 through which a sheet metal screw 214 extends, whereby the wind deflector may be secured directly to the car. As is shown in FIG. 6, the inner slanted sides of the flanges will lay closely flush to the door 210.

Figure 7:
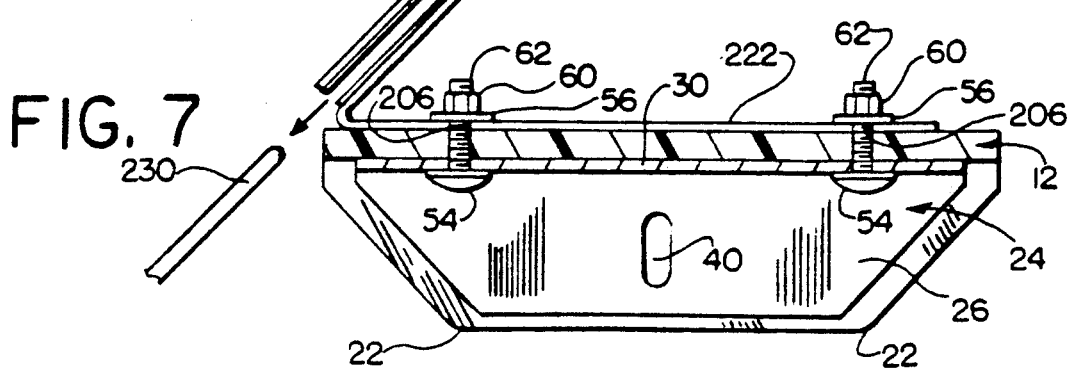
FIG. 7 is a top sectional view of yet another embodiment of the present invention.

Referring now to FIG. 7, a further embodiment of the present invention is shown. In this embodiment the wind deflector is secured to the vehicle by a clip clamp 220. Similar to the embodiment shown in FIG. 6, the clip clamp 220 attahces to a vertical portion of the panel 12 rather than the flanges 14 and 16. The clip clamp 220 includes a planar arm portion 222 which has two aligning holes 224. The panel studs 54 extend through holes 52 in the reinforcing plate, holes 50 in the panel 12 and holes 224 in the clip clamp 220. The parts are locked together by the washer 56 and the nut 60. Again the flange bolts 34 may still be employed to secure the reinforcing plate 24 to the flanges 14 and 16. The clip clamp 220 also includes a clip portion 226 extending from the planar arm portion 222 at roughly a 45° C. angle. The clip protion 226 resembles an elongated U-shape channel and is dimensioned to clip onto a vent window 230. The clip portion 226 may have a plastic lining 232 secured to its interior to improve the grip upon the window.

With the embodiments of FIGS. 6 and 7 it will be appreciated that the mounting means may be secured directly to the upper and lower portions of the main vertical portion of the deflector panel and bent flanges may be omitted.

One may now appreciate that there is provided a low cost readily attachable wind deflector for use with truck or tractor cabs which enables the driver to travel with the window open while at the same time assisting in maintaining the reflective surface of the rear view mirror clean and reducing drag. The reinforcing plate strengthens the panel in the bend area, thereby preventing premature fracture. Additionally, the wind deflector may be mounted in a variety of ways using the same or similar parts.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A wind deflector for mounting on the side of a truck, comprising:
   a vertically elongated panel of transparent material;
   two flanges, one at each vertical end of said panel;
   two bends connecting said flanges to said panel;
   reinforcing means for strengthening the panel along said bends and preventing premature fracture of said panel; and
   mounting means for mounting the wind deflector to the truck.

2. A wind deflector as set forth in claim 1 wherein said reinforcing means includes two reinforcing plates, one secured to éach of the vertical ends of said panel; each reinforcing plate including a vertical portion secured flush against a portion of said panel and a horizontal portion secured flush against each flange.

3. A wind deflector as set forth in claim 2 wherein said panel is a thick sheet of transparent plastic bent at its vertical ends to form said flanges.

4. A wind deflector as set forth in claim 1 wherein said mounting means includes a flange stud projecting through one of said reinforcing plates and one of said flanges, and a planar arm portion having an adjustment slot dimensioned to receive said flange stud whereby said planar arm portion may be adjustably secured along said flange stud to adjust both the azimuth and radial extent of said panel relative to the side of the truck.

5. A wind deflector as set forth in claim 4 wherein said flange studs extend vertically through said horizontal portions of said plates and through said flanges.

6. A wind deflector as set forth in claim 5 wherein said flange stud includes a head and wherein the wind deflector further comprises a nut and lock washer on said flange stud on one side of said respective flange cooperating with said head and the washer on the oposite side of said flange to secure said threaded stud ot said flange.

7. A wind deflector as set forth in claim 4 wherein said planar arm portion has a mounting hole; and said mounting means further includes a mounting stud dimensioned to be received in said mounting hole, and a nut and lock washer on said mounting stud to secure the wind deflectorr to a mounting angle flange of a truck rear view mirror assembly.

8. A wind deflector as set forth in claim 4 wherein said mounting means further includes a tab having a mounting hole and extending perpendicularly from said planar arm, a mounting stud dimensioned to be received in said mounting hole, and a nut and lock washer on said mounting stud to secure the wind deflector to a mounting flange of a truck rear view mirror assembly.

9. A wind deflector as set forth in claim 2 wherein said reinforcing plates are made of metal.

10. A wind deflector as set forth in claim 9 wherein said metal is stainless steel.

11. In combination, a truck cab including a side window, and wind deflector means for deflecting wind away from said side window and across the reflective face of said rear view mirror;

said wind deflector means comprising a vertically elongated panel of transparent material; two flanges, one flange located at each vertical end of said panel; two bends connecting said flanges to said panel; reinforcing means for strengthening the panel along said bend and preventing premature fracture of said panel; and mounting means for mounting said wind deflector means to said truck.

12. The combination set forth in claim 11 wherein said reinforcing means includes two reinforcing plates, one secured to each of the vertical ends of said panel; each reinforcing plate including a vertical portion secured flush against a portion of said panel and a horizontal portion secured flush against each flange.

13. The combination set forth in claim 12 wherein said panel is a thick sheet of transparent plastic bent at its vertical ends to form said flanges.

14. The combination set forth in claim 13 wherein said mounting means include a flange stud projecting through one of said reinforcing plates and one of said flanges; and a planar arm portion having a slot dimensioned to received one said flange stud whereby said planar arm portion may be adjustably secured along said flange stud to adjust both the azimuth and radial extent of said panel relative to the side of the truck.

15. The combination set forth in claim 14 wherein said truck cab includes a mounting angle flange for mounting said rear view mirror, said mounting flange including a vertical portion secured to the door and a horizontal portion connected to said vertical portion; wherein said planar arm portion has a mounting hole; and wherein said mounting means further includes a mounting stud dimensioned to be received in said mounting hole, and a nut and lock washer on said mounting stud to secure said wind deflector means to said horizontal portion of said mounting angle flange.

16. The combination set forth in claim 14 wherein said truck cab includes a mounting flange for mounting said rear view mirror, said mounting flange including a vertical portion secured to said door; and wherein said mounting means further includes a tab having a mounting hole and extending perpendicularly from said planar arm, a mounting stud dimensioned to be recieved in said mounting hole, a nut and lock washer on said mounting stud to secure the wind deflector to said vertical portion of said mounting flange.

17. A wind deflector as set forth in claim 1 wherein said mounting means is selected from a group consisting of:

flange mounting means, attached to one of said end flanges, for adjustably mounting the wind deflector to a mounting flange of a truck rear view mirror assembly;

door mounting means for mounting the wind deflector directly to a door of such truck; and clip mounting means for clipping the wind deflector onto a vent window of such truck.

* * * * *